US008684882B2

(12) United States Patent
Kondo

(10) Patent No.: US 8,684,882 B2

(45) Date of Patent: Apr. 1, 2014

(54) POWER TOOL

(75) Inventor: Tomoyuki Kondo, Anjo (JP)

(73) Assignee: Makita Corporation, Anjo-Shi (JP)

( * ) Notice: Subject to any disclaimer, the term of this patent is extended or adjusted under 35 U.S.C. 154(b) by 224 days.

(21) Appl. No.: 13/409,761

(22) Filed: Mar. 1, 2012

(65) Prior Publication Data

US 2012/0258832 A1 Oct. 11, 2012

(30) Foreign Application Priority Data

Apr. 5, 2011 (JP) ................................ 2011-083935

(51) Int. Cl.
*F16H 3/44* (2006.01)
*F16H 57/08* (2006.01)

(52) U.S. Cl.
USPC .......................................... 475/299; 475/331

(58) Field of Classification Search
USPC .......................................... 475/331, 298–300
See application file for complete search history.

(56) References Cited

U.S. PATENT DOCUMENTS

| | | | | |
|---|---|---|---|---|
| 6,239,503 | B1 * | 5/2001 | Ikeda et al. | 290/38 R |
| 7,066,691 | B2 | 6/2006 | Doyle et al. | |
| 2011/0196375 | A1 * | 8/2011 | Li et al. | 606/80 |

* cited by examiner

*Primary Examiner* — Tisha Lewis
(74) *Attorney, Agent, or Firm* — Oliff PLC

(57) ABSTRACT

In a power tool, a tubular gear case is disposed frontwardly of a motor and configured to accommodate a planetary gear speed reduction mechanism, a tubular motor bracket is attached to the motor and configured to connect the motor and the gear case together, and at least one pin is pierced through the motor bracket and the gear case to connect the motor bracket and the gear case together. The pin is engaged with a first-stage internal gear located at a first stage of the planetary gear speed reduction mechanism whereby the first-stage internal gear is restrained from rotating and located in position in an axial direction thereof.

12 Claims, 15 Drawing Sheets

POWER TOOL

BACKGROUND OF INVENTION

This application claims the benefit of Japanese Patent Application Number 2011-083935 filed on Apr. 5, 2011, the entirety of which is incorporated by reference.

TECHNICAL FIELD

The present invention relates generally to power tools, and more particularly to a power tool such as a percussion driver drill comprising a motor and a planetary gear speed reduction mechanism.

BACKGROUND ART

A power tool such as a percussion driver drill known in the art typically includes a housing, a motor accommodated in the housing, and a planetary gear speed reduction mechanism disposed frontwardly of the motor so that a rotatory motion of an output shaft of the motor of which the rotation speed is reduced by the planetary gear speed reduction mechanism is transmitted to a spindle. These motor and planetary gear speed reduction mechanism are assembled together by joining a tubular motor bracket attached to the motor and a tubular gear case in which the planetary gear reduction mechanism is accommodated. A structure for connecting the motor bracket and the gear case together may use a bayonet joint known in the art. Another structure as disclosed in U.S. Pat. No. 7,066,691 B2 may also be adopted in which right and left overlapped portions of the motor bracket and the gear case are pierced with right and left pins by which the motor bracket and the gear case are connected together.

However, the aforementioned bayonet joint structure or the structure disclosed in U.S. Pat. No. 7,066,691 B2 require additional configuration by which internal gears at each stage of the planetary gear speed reduction mechanism are restrained from rotating during their mounting process. Such additional configuration may be provided as a dedicated structure which includes grooves extending in the axial direction and formed in an inner surface of the motor bracket or the gear case, and projections or ridges provided on outer peripheries of the internal gears, such that the projections are fitted in the grooves. This additional configuration however increases the complexity of the shape of the gear case, which would disadvantageously increase the manufacturing costs and lower the rigidity at its grooved and thin-walled portions.

With this in view, there is a need to provide a power tool in which the shape of the gear case can be simplified while keeping the rigidity thereof.

The present invention has been made in an attempt to eliminate the above disadvantage, and illustrative, non-limiting embodiments of the present invention overcome the above disadvantage and other disadvantages not described above.

SUMMARY OF INVENTION

In one aspect of the present invention, a power tool is provided in which assembly of the motor bracket and the gear case is associated with the process of mounting the internal gears whereby the shape of the gear case can be simplified without impairing the rigidity thereof.

(1) More specifically, a power tool proposed herein according to one or more embodiments comprises a motor, a tubular gear case disposed frontwardly of the motor and configured to accommodate a planetary gear speed reduction mechanism, a tubular motor bracket attached to the motor and configured to connect the motor and the gear case together, and at least one pin pierced through the motor bracket and the gear case to connect the motor bracket and the gear case together, wherein the pin is engaged with a first-stage internal gear located at a first stage of the planetary gear speed reduction mechanism whereby the first-stage internal gear is restrained from rotating and located in position in an axial direction thereof.

(2) In the power tool configured as described in (1) above, optionally, the pin may comprise two pins disposed in positions axisymmetric with respect to an output shaft of the motor.

(3) In the power tool configured as described in (1) above, with or without the features described in (2) above, optionally, the first-stage internal gear may include a partially trimmed portion at a side thereof, which is composed of an offset surface and a flange portion, the offset surface extending along the pin pierced through the motor bracket and the gear case, the flange portion protruding from a rear edge of the offset surface in a direction perpendicular to the offset surface and in a radial direction of the first-stage internal gear, whereby the pin is in contact with the offset surface to restrain the first-stage internal gear from rotating and is in contact with the flange portion to locate the first-stage internal gear in position in the axial direction thereof.

With the configurations described above, various advantageous effects may be expected as follows.

For example, according to one or more aspects of the present invention, as mentioned above particularly in (1), the assembly of the motor bracket and the gear case can be associated with the process of mounting the internal gears. Therefore, the shape of the gear case can be simplified and the rigidity thereof can be ensured.

According to the configuration described in (2) above, in addition to the advantage described above in relation to the configuration described in (1), the motor bracket and the gear case can be combined together securely into one integral body.

According to the configuration described in (3) above, in addition to the advantage described above in relation to the configurations described in (1) or (2), a reasonable structure can be implemented in which a single pin is used for two purposes of (a) restraining the internal gear from rotating and (b) locating the internal gear in position in the axial direction thereof.

BRIEF DESCRIPTION OF DRAWINGS

The above and other aspects, other advantages and further features of the present invention will become more apparent by describing in detail illustrative, non-limiting embodiments thereof with reference to the accompanying drawings.

DESCRIPTION OF EMBODIMENTS

An illustrative embodiment of the present invention will be described in detail with reference to the drawings.

Figure 1:
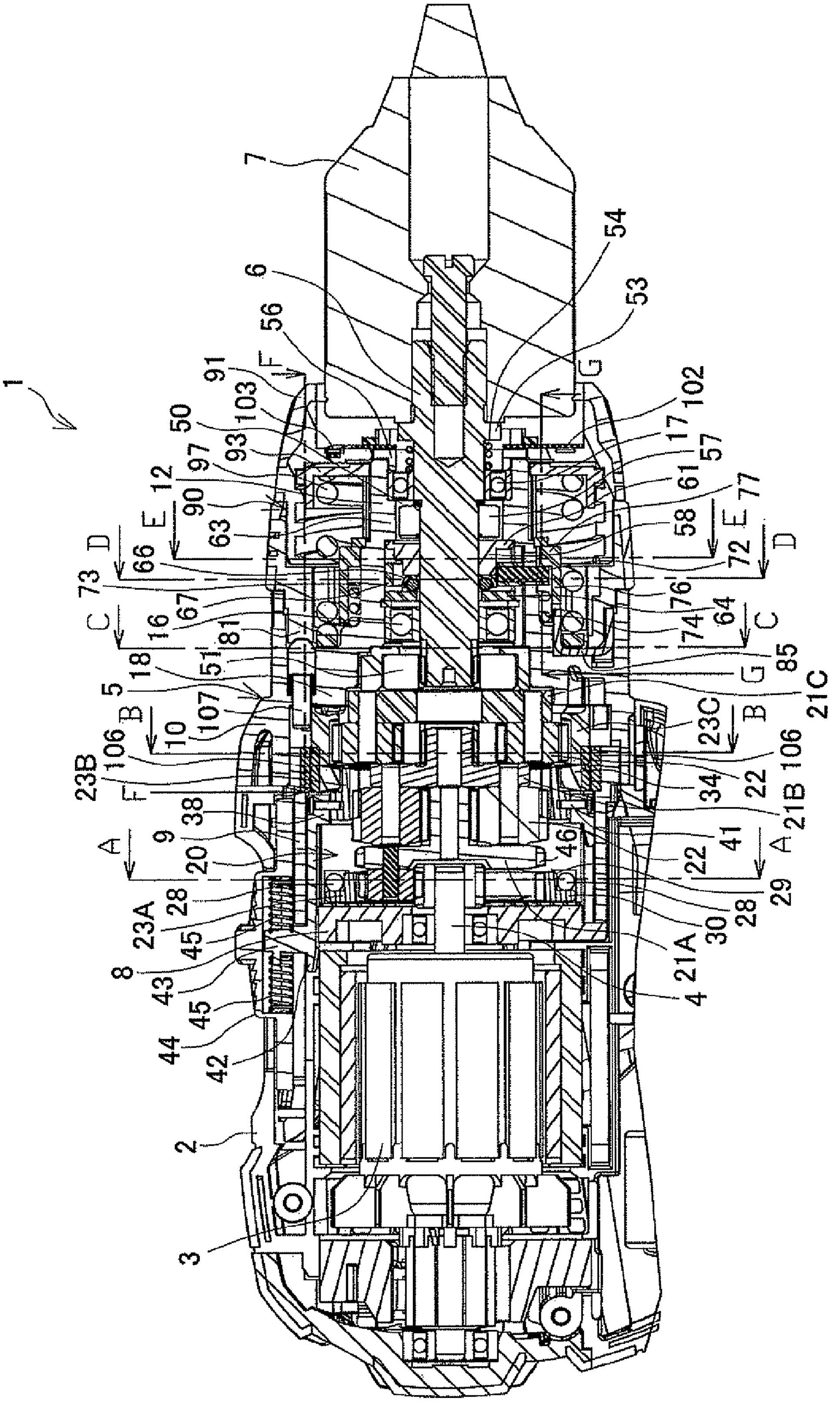
FIG. 1 is a longitudinal section of a percussion driver drill in a drill mode.
Figure 2:
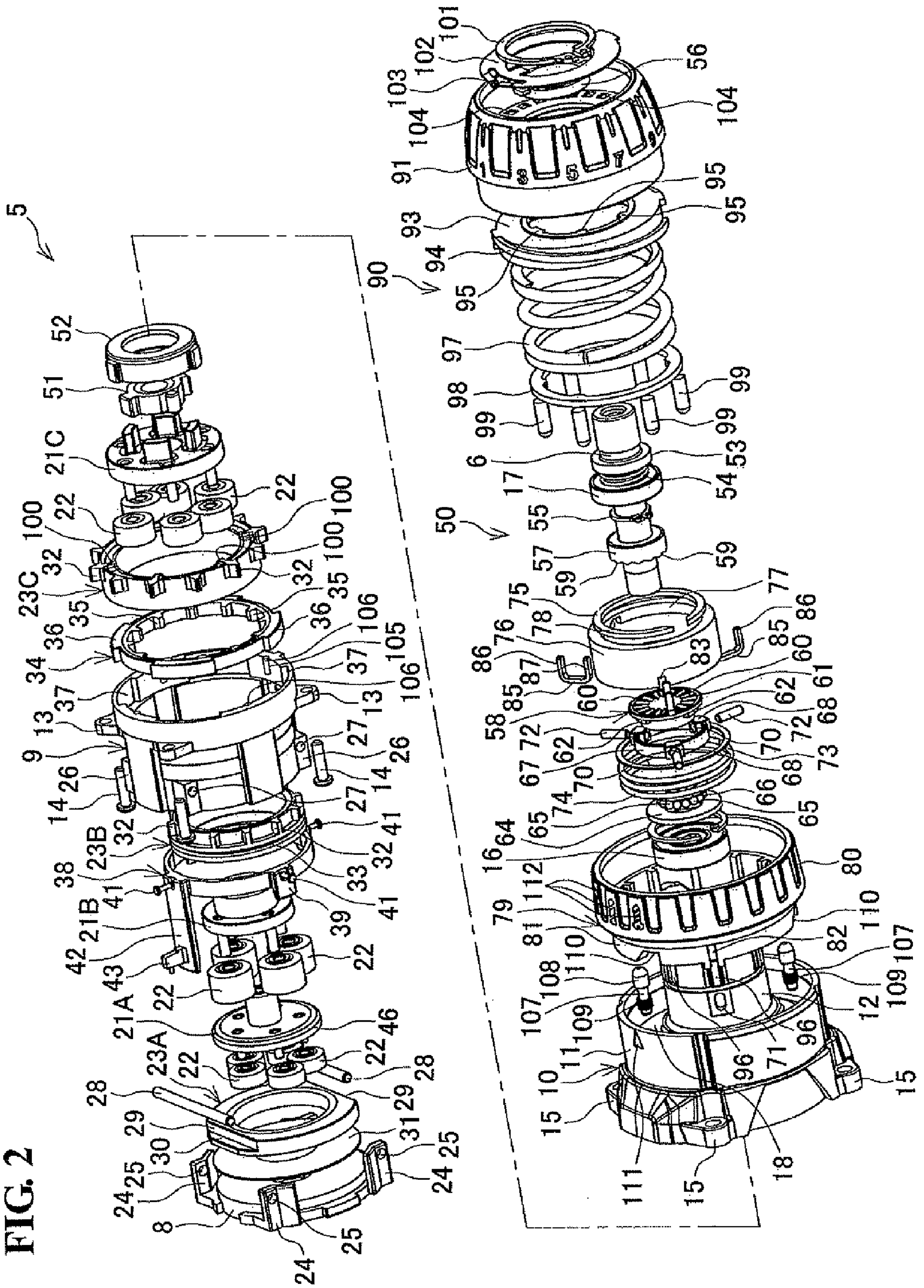
FIG. 2 is an exploded perspective view of a gear assembly.

Referring to FIGS. 1 and 2, which show a longitudinal section and an exploded perspective view of a percussion driver drill as one example of a power tool, a percussion driver drill 1 includes a body housing 2, a motor 3 provided with an output shaft 4 and disposed in a rear space (hereinafter the right side of FIG. 1 is assumed to be the "front" side of the percussion driver drill 1) inside the body housing 2, and a gear assembly 5 mounted inside the body housing 2 in a position frontward of the motor 3. The gear assembly 5 is provided with a spindle 6 protruding frontward, and is configured to transmit rotation of the output shaft 4 of the motor 3 to the spindle 6. A drill chuck 7 having a front end configured to hold a bit is provided at a front end of the spindle 6.

A motor bracket 8 is mounted to a front side of the motor 3, and the output shaft 4 is rotatably supported in the motor bracket 8. The gear assembly 5 includes a first gear case 9 and a second gear case 10. The first gear case 9 has a tubular shape, and is connected to the motor bracket 8. The second gear case 10 has a dual-diameter tubular shape with a large-diameter portion 11 and a small-diameter portion 12, and is mounted to a front side of the first gear case 9. Four bosses 13 are provided protrusively on an outer peripheral surface of a front end portion of the first gear case 9. The first and second gear cases 9, 10 are joined together by fastening the bosses 13 to a rear surface of the second gear case 10 by screws 14. Four bosses 15 are provided protrusively on an outer peripheral surface of a rear end portion of the large-diameter portion 11 of the second gear case 10. The gear assembly 5 is joined to the body housing 2 by fastening the bosses 15 to a front end of the body housing 2 by screws 15*a* (see FIGS. 5, 6 and other drawing figures).

A planetary gear speed reduction mechanism 20 is disposed inside the gear assembly 5. In the gear assembly 5, three sets of carriers 21A, 21B, 21C each of which support a plurality of planetary gears 22 configured to revolve inside a corresponding internal gear 23A, 2313, 23C are arranged in the axial direction. First-stage planetary gears 22 provided at a first stage (i.e., the planetary gears 22 supported by the carrier 21A inside the internal gear 23A) of the planetary gear speed reduction mechanism 20 are in mesh with the output shaft 4 of the motor 3.

Figure 3:
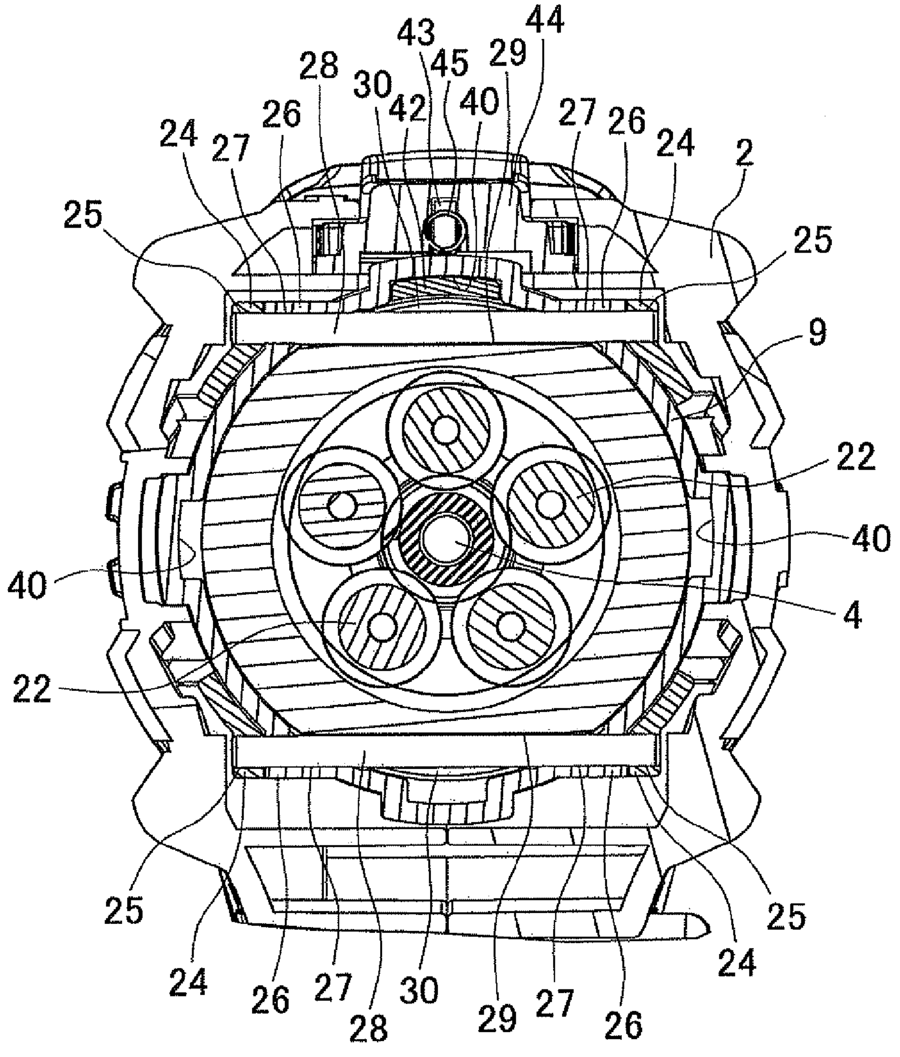
FIG. 3 is an enlarged section taken along line A-A of FIG. 1.

A pair of joint plates 24 is formed in each of upper and lower portions of the motor bracket 8. The joint plates 24 of each pair are spaced to the right and to the left at a predetermined interval and configured to protrude frontward with apertures 25 formed at opposed faces thereof. On the other hand, at an outer peripheral surface of a rear end portion of the first gear case 9, projections 26 protruding rightward and leftward are formed in its upper and lower positions corresponding to the joint plates 24. The length of each projection 26 in the right-left direction coincides with the interval between the right and left joint plates 24. A through hole 27 extending in the right-left direction is formed in each projection 26. The motor bracket 8 and the first gear case 9 are, as also shown in FIG. 3, combined together by fitting the upper and lower projections 26 of the first gear case 9 into a gap between the joint plates 24 of the motor bracket 8, and then inserting, from right or left, pins 28 to be disposed in upper and lower positions axisymmetric with respect to the output shaft 4 into the apertures 25 and the through holes 27, respectively.

The first-stage internal gear 23A provided at the first stage (arranged at the front side of the motor bracket 8) of the planetary gear speed reduction mechanism 20 includes a pair of partially trimmed portions at upper and lower portions thereof, each of which is composed of an offset surface 29 and a flange portion 30. The partially trimmed portions are configured to be arranged (i.e., to have offset surfaces 29 disposed) in positions corresponding to those of the pins 28 pierced through the motor bracket 8 and the first gear case 9. Each flange portion 30 protrudes from a rear edge of the corresponding offset surface 29 in a direction perpendicular to the offset surface 29 and in a radial direction of the internal gear 23A. When the motor bracket 8 and the first gear case 9 are combined together, the upper and lower pins 28 are pierced through the first gear case 9 along the offset surfaces 29 at the fronts of the flange portions 30 in the partially trimmed portions of the internal gear 23A. Accordingly, the internal gear 23A is restrained from rotating by the pins 28 engaged in the partially trimmed portions (i.e., fitted on the offset surfaces 29), and is located in position in the front-rear direction (i.e., the axial direction of the internal gear 23A) by the pins 28 abutted on the flange portions 30. A washer 31 is interposed between the motor bracket 8 and the internal gear 23A.

Furthermore, in the planetary gear speed reduction mechanism 20, the second-stage internal gear 23B provided at the second stage of the planetary gear speed reduction mechanism 20 is configured to be rotatable and movable frontward and rearward in the axial direction. At the outer peripheral surface of the internal gear 23B, a plurality of external gear teeth 32 and an engageable groove 33 are provided. The plurality of external gear teeth 32 extending in the axial direction are arranged at predetermined intervals in its circumferential direction protrusively on a front half region of the outer peripheral surface of the internal gear 23B. The engageable groove 33 extending in the circumferential direction is provided in a rear half region of the outer peripheral surface of the internal gear 23B. A joint ring 34 is held inside a front portion of the first gear case 9. A plurality of internal gear teeth 35 extending in the axial direction are protrusively provided on an inner peripheral surface of the joint ring 34. The number of the internal gear teeth 35 is the same as that of the external gear teeth 32 of the internal gear 2313. A plurality of ridges 36 extending in its circumferential direction are provided at regular intervals in the circumferential direction protrusively on an outer peripheral surface of the joint ring 34. A plurality of restriction grooves 37 extending in the axial direction are provided in an inner peripheral surface of the front end portion of the first gear case 9. The ridges 36 are fitted in the restriction grooves 37 to thereby restrain the joint ring 34 from rotating.

On the other hand, a speed change ring 38 is fitted on the rear half region of the outer peripheral surface of the internal gear 23B. The speed change ring 38 has projections 39 provided on an outer peripheral surface thereof. The projections 39 of the speed change ring 38 are engaged with guide grooves 40 formed in a rear side region of an inner peripheral surface of the first gear case 9. The guide grooves 40 extend in the axial direction of the first gear case 9 so that the speed change ring 38 engaged there with can move only in the front-rear direction. Joint pins 41 are pierced through holes provided in the projections 39, from outside in radial directions of the speed change ring 38, and an inner end portion of each joint pin 41 is fitted in the corresponding engageable groove 33 of the internal gear 23B. One of the projections 39 disposed on an upper portion of the internal gear 23B has an extension portion 42 extending rearward to exhibit a rearwardly elongated shape. A coupling piece 43 is protrusively provided on an upper surface of a rear end portion of the extension portion 42. A speed change slider control 44 is provided in the body housing 2 in such a manner that the speed change slider control 44 is slidable in the front-rear direction, and the coupling piece 43 of the extension portion 42 is coupled to the speed change slider control 44 with coil springs 45 interposed therebetween.

Accordingly, when the speed change slider control 44 is slid rearward, the coupling piece 43 is pushed rearward and thus the speed change ring 38 is moved rearward, then, the internal gear 23B connected via the joint pins 41 with the speed change ring 38 is brought into mesh with gear teeth 46 provided on an outer peripheral surface of a first-stage carrier 21A (one of the carriers provided at the first stage of the planetary gear speed reduction mechanism 20) while being kept in mesh with second-stage planetary gears 22 (a set of planetary gears provided at the second stage of the planetary gear speed reduction mechanism 20). As a result, the second-stage speed reduction is cancelled to achieve a high-speed mode. Contrariwise, when the speed change slider control 44 is slid frontward, the internal gear 23B is moved together with the speed change ring 38 and separated from the carrier 21A, then, the external gear teeth 32 of the internal gear 23B is brought into mesh with the internal gear teeth 35 of the joint ring 34 while the internal gear 23B is kept in mesh with the second-stage planetary gears 22. As a result, the second-stage speed reduction is enabled to achieve a low-speed mode.

In this embodiment, a vibration mechanism 50 configured to impart a vibratory motion in the axial direction to the spindle 6 is provided inside the small-diameter portion 12 of the second gear case 10, and a clutch mechanism 90 configured to interrupt transmission of torque to the spindle 6 at overload beyond a predetermined threshold is provided outside the small-diameter portion 12 of the second gear case 10, so that a mode change operation as will be described later may be performed for selection among a percussion drill mode in which the spindle 6 is caused to make a vibratory motion while making a rotatory motion, a drill mode in which the spindle 6 is caused to make the rotatory motion only, and a clutch mode (driver mode) in which a transmission of torque to the spindle 6 is interrupted at overload beyond the predetermined threshold. The next discussion focuses on each of these mechanisms 50, 90.

In the vibration mechanism 50, the spindle 6 is rotatably supported on front and rear ball bearings 16, 17 in the small-diameter portion 12, and a rear end portion of the spindle 6 is spline-fitted in a lock cam 51 that is formed integrally with the third-stage carrier 21C, so that the spindle 6 can move in the front-rear direction. A cap 52 is put over the lock cam 51 from a front side and fitted thereto in the small-diameter portion 12.

The spindle 6 has a flange 53 formed at a position therein closer to a front end of the spindle 6. A retaining ring 55 is fitted on the spindle 6 in a position rearward of the ball bearings 17. In a normal state, the spindle 6 is biased by a coil spring 54 fitted thereon in a position between the flange 53 and the ball bearings 17, toward an advanced position in which the retaining ring 55 is brought into contact with the ball bearings 17. A spacer 56 is fitted in a front end portion of the small-diameter portion 12 to locate the ball bearings 17 in position.

Figure 7:
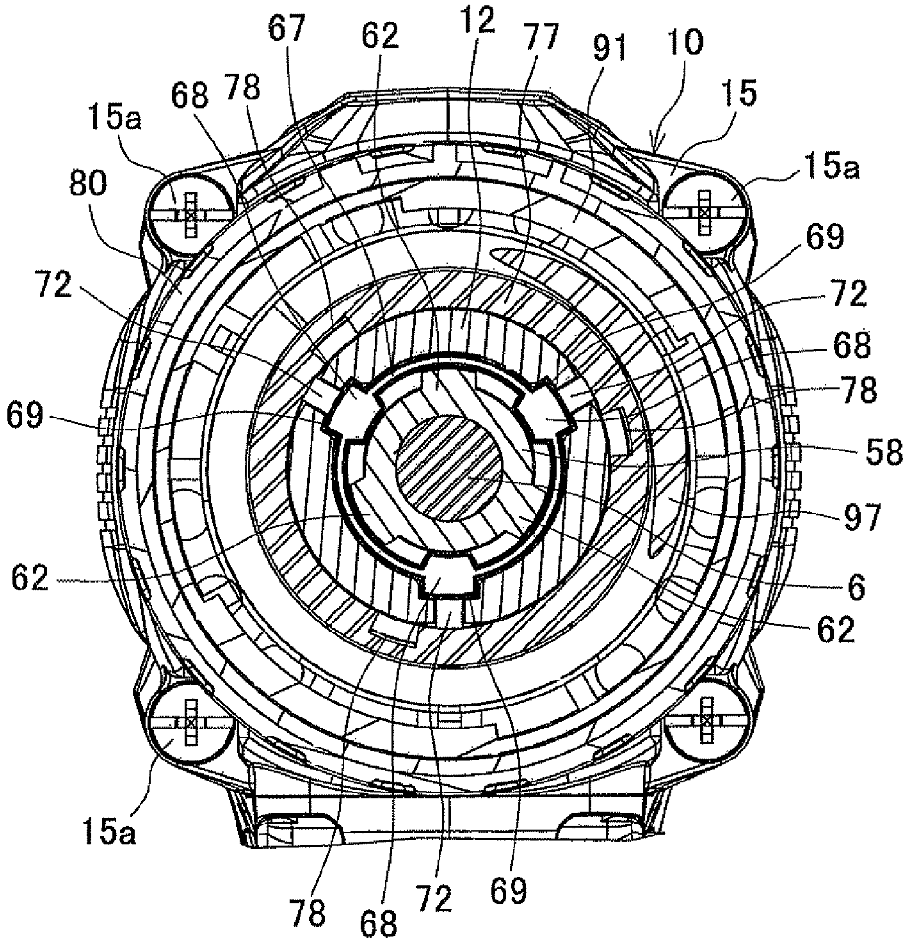
FIG. 7 is an enlarged section taken along line E-E of FIG. 1.

A first cam 57 and a second cam 58 each shaped like a ring are arranged in this order from the front and fitted coaxially on the spindle 6, and positioned between the ball bearings 16 and the ball bearings 17. The first cam 57 has first cam teeth 59 circumferentially arranged and radially formed contiguously on a rear end of the first cam 57. The first cam 57 is fixed on the spindle 6. The second cam 58 has second cam teeth 60 formed, symmetrically to the first cam teeth 59, on a front end of the second cam 58 which is opposite to the first cam teeth 59 formed on the rear end of the first cam 57. The second cam 58 is loosely fitted on the spindle 6. A flange 61 is formed at a peripheral edge of the front end portion of the second cam 58. Three engageable projections 62 are protrusively provided in positions which are rearwardly of the flange 61 and equidistantly arranged on an outer peripheral surface of the second cam 58, as also shown in FIG. 7.

Furthermore, an annular stepped portion 63 is protrusively provided in a position frontward of the second cam 58 on an inner peripheral surface of the small-diameter portion 12, and a washer 66 is provided in a position rearward of the second cam 58, and held on a plurality of steel balls 65 which are held on a front side of a stopper plate 64 fixed inside the small-diameter portion 12. Accordingly, the second cam 58 is restrained from moving in the axial direction between the stepped portion 63 and the washer 66.

Figure 6:
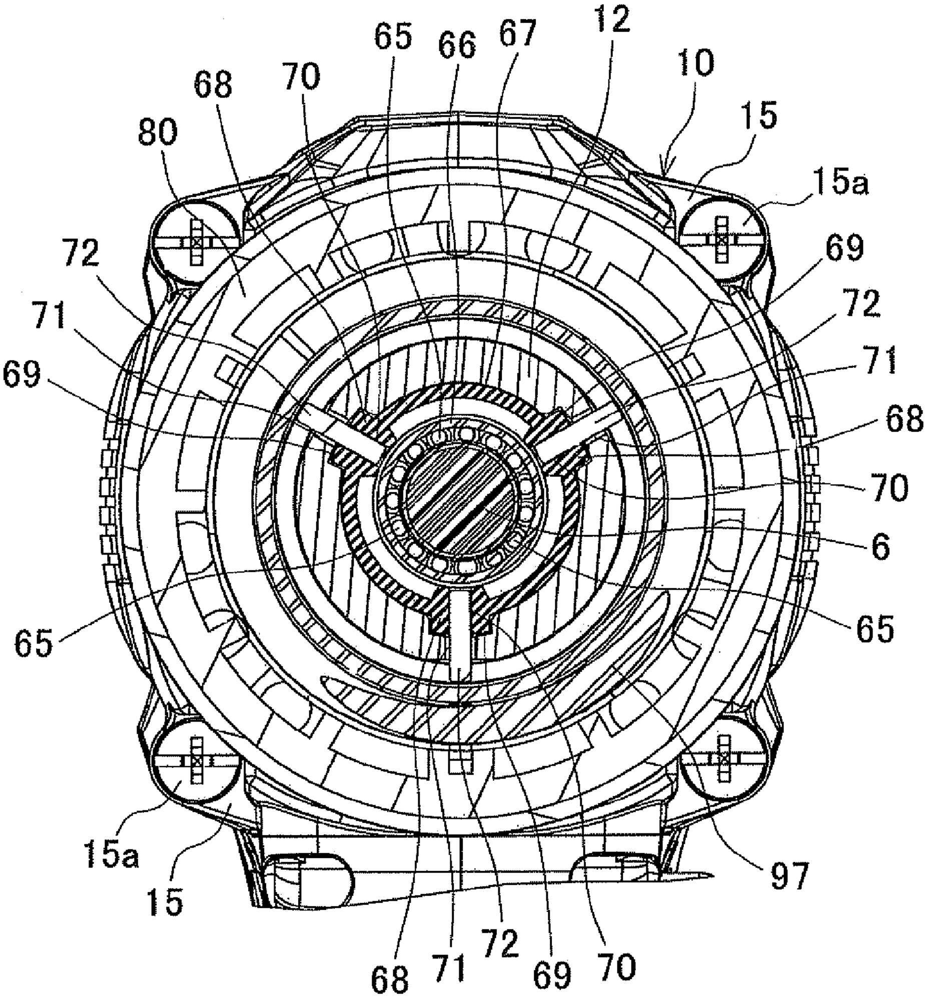
FIG. 6 is an enlarged section taken along line D-D of FIG. 1.

On the other hand, inside the small-diameter portion 12, a slide ring 67 is accommodated, and is disposed on an outer peripheral surface of the second cam 58. The slide ring 67 has substantially the same diameter as that of the second cam 58. In this slide ring 67, as shown in FIGS. 6 and 7, three restraining projections 68 are integrally formed to protrude radially inwardly and outwardly from an annular body of the slide ring 67 at three positions arranged equidistantly in the circumferential direction. Outwardly protruding portions of the restraining projections 68 are fitted respectively in axially extending guide grooves 69 formed in an inner peripheral surface of the small-diameter portion 12. With this configuration, the slide ring 67 is rendered slidable in the front-rear direction inside the small-diameter portion 12 while being restrained from rotating. Each restraining projection 68 has a connecting hole 70 pierced therethrough in the radial direction of the slide ring 67. Inwardly protruding portions of the restraining projections 68 are each shaped to have a circumferential thickness tapering toward the center (inner end thereof). The slide ring 67 cooperates with the first cam 57 and the second cam 58 to function as a cam mechanism.

Elongate holes 71 extending in the front-rear direction are provided in the small-diameter portion 12, as shown in FIG. 6. One elongate hole 71 is disposed in each guide groove 69 in which the restraining projection 68 of the slide ring 67 is fitted. A connecting pin 72 is disposed in each elongate hole 71 in the radial direction of the small-diameter portion 12. An inner end portion of each connecting pin 72 is inserted in the connecting hole 70 of the restraining projection 68. A washer 73 is fitted on the outer peripheral surface of the small-diameter portion 12, in a position rearward of the connecting pins 72 protruding from the elongate holes 71, and a coil spring 74 is fitted on the outer peripheral surface of the small-diameter portion 12, in a position rearward of the washer 73 (i.e., at a proximal end of the small-diameter portion 12). Accordingly, the connecting pins 72 are pressed by the coil spring 74 through the washer 73, so that the connecting pins 72 and the slide ring 67 connected therewith are biased frontward.

Figure 9:
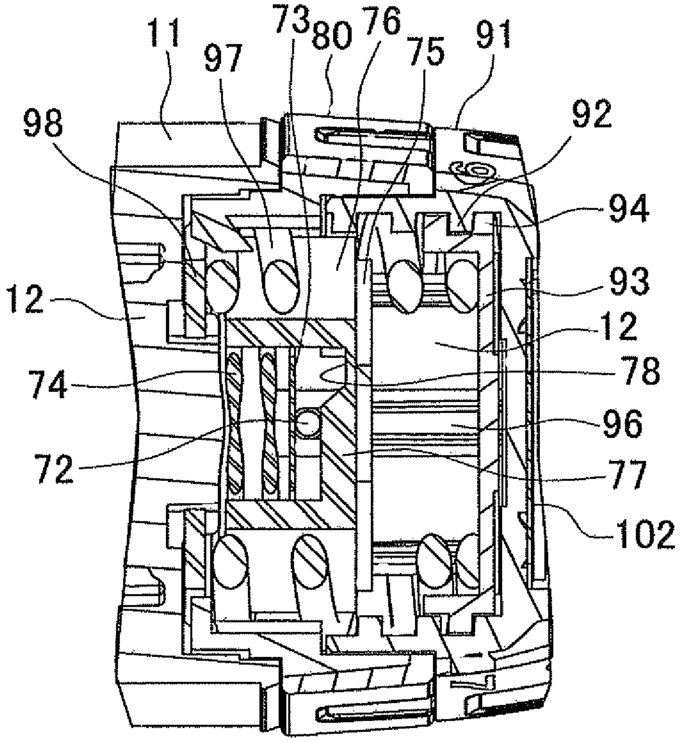
FIG. 9 is an enlarged section taken along line G-G of FIG. 1.

On the other hand, a tubular vibration switch cam 76 is rotatably fitted on the outer peripheral surface of the small-diameter portion 12 in a position outside the connecting pins 72. The vibration switch cam 76 is restrained from moving frontward by a stopper ring 75. On an inner peripheral surface of the vibration switch cam 76, at a front end portion thereof, a cam ridge 77 is provided to protrude inwardly therefrom, and outer end portions of the connecting pins 72 are in contact with the cam ridge 77 so that the slide ring 67 is restrained from moving frontward. On the rear edge of the cam ridge 77, three trapezoidal engageable recessed portions 78 are formed in positions arranged equidistantly in the circumferential direction, as shown in FIG. 9.

With this configuration, when the vibration switch cam 76 is rotated to a first angular position in which the engageable recessed portions 78 are in phase (in positions phase-matched) with the connecting pins 72, the connecting pins 72 get engaged with the engageable recessed portions 78 and located into advanced positions. On the other hand, when the vibration switch cam 76 is rotated to a second angular position in which the engageable recessed portions 78 are out of the positions phase-matched with the connecting pins 72, the connecting pins 72 get out of the engageable recessed portions 78, running on the rear end portion of the cam ridge 77, and come to retreated positions in which the connecting pins 72 are retained. When the connecting pins 72 come to the advanced positions, the slide ring 67 is also advanced and brought into contact with the flange 61 of the second cam 58 so that the restraining projections 68 of the slide ring 67 are positioned between the engageable projections 62 of the second cam 58 to restrain the second cam 58 from rotating (i.e., the slide ring 67 comes to a first slide position). On the other hand, when the connecting pins 72 come to the retreated positions, the slide ring 67 is also retreated so that the restraining projections 68 of the slide ring 67 are retreated and disengaged from the engageable projections 62 of the second cam 58 to make the second cam 58 freely rotatable (i.e., the slide ring 67 comes to a second slide position).

The rotatory motion of the vibration switch cam 76 is caused by means of a mode change ring 79 which is rotatably fitted on the large-diameter portion 11 of the second gear case 10. The mode change ring 79 has a two-diameter stepped structure and includes an operating portion 80 and an insert portion 81. The operating portion 80 having substantially the same diameter as that of the large-diameter portion 11 is disposed frontward, and the insert portion 81 having such a smaller diameter as to be inserted in the large-diameter portion 11 is disposed rearward. On an outer peripheral surface of the insert portion 81, three engageable grooves 82 extending in the axial direction are formed in positions arranged equidistantly in the circumferential direction. Similarly, three notches 83 are formed in positions phase-matched with the engageable grooves 82 at a rear end of the vibration switch cam 76.

Figure 5:
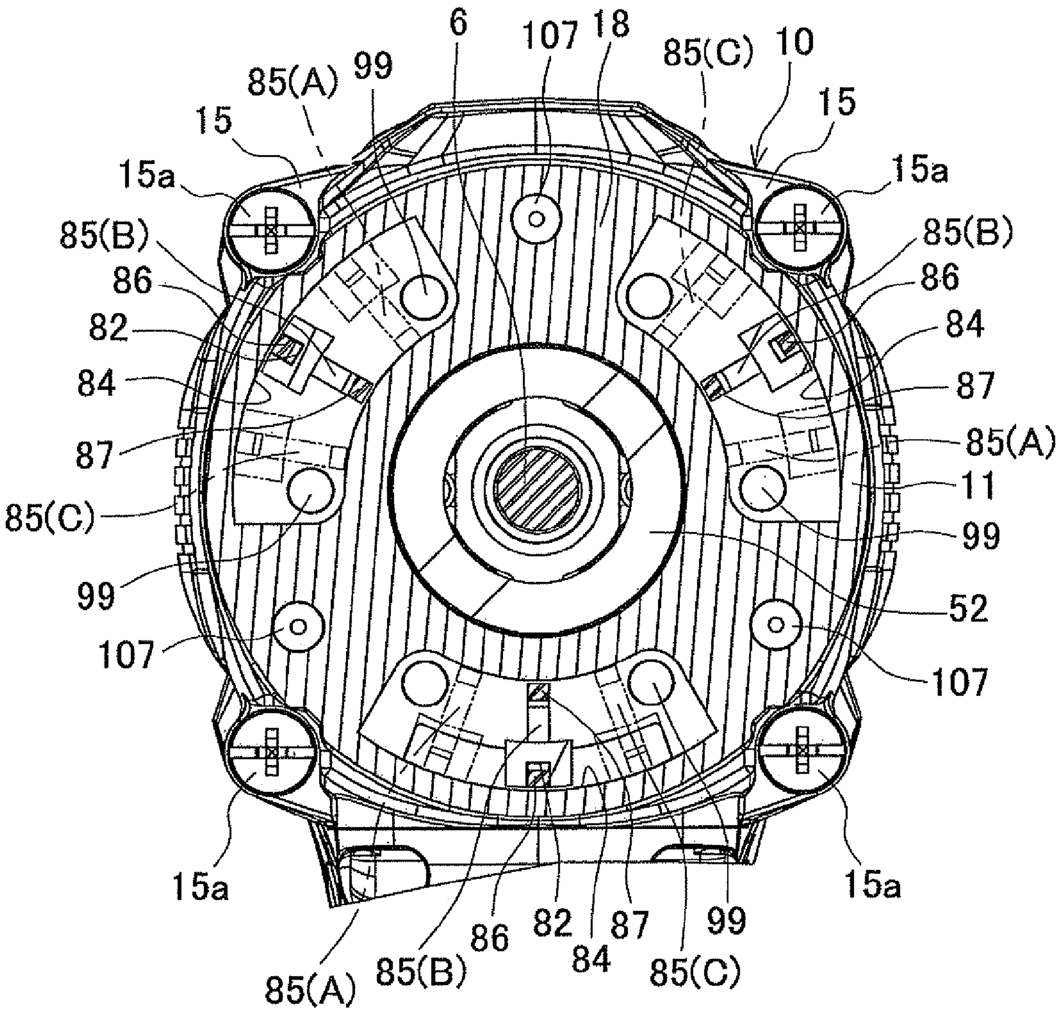
FIG. 5 is an enlarged section taken along line C-C of FIG. 1.

On the other hand, in a front surface of a blocking portion 18 which connects the large-diameter portion 11 and the small-diameter portion 12 of the second gear case 10, three receptacle recessed portions 84 having a predetermined length in the circumferential direction are formed as shown in FIG. 5. A U-shaped coupling rod 85 having two legs (end portions) is provided in each of the receptacle recessed portions 84 and disposed along the radial direction of the blocking portion 18 with the legs pointed frontward. An outer end portion 86 (one of the two legs) of each coupling rod 85 is fitted in the engageable groove 82 of the insert portion 81 while an inner end portion 87 (the other of the two legs) of each coupling rod 85 is retained in the notch 83 of the vibration switch cam 76. Accordingly, when the operating portion 80 is held and the mode change ring 79 is rotated, the coupling rods 85 are rotated and thereby the vibration switch cam 76 inside are rotated at the same time, so that the connecting pins 72 and the slide ring 67 can be moved frontward or rearward.

Next, the clutch mechanism 90 will be described hereafter.

A clutch ring 91 with a spring holder 93 disposed inside is rotatably fitted on the small-diameter portion 12 in a position frontward of the mode change ring 79. An internal thread portion 92 is formed on an inner peripheral surface of the clutch ring 91, and an external thread portion 94 is formed on an outer peripheral surface of the spring holder 93. The spring holder 93 is screwed in the clutch ring 91 and fitted on the small-diameter portion 12. The spring holder 93 includes projections 95 formed at an inner peripheral surface thereof, and the projections 95 are fitted in grooves 96 formed in the axial direction in an outer peripheral surface of the small-diameter portion 12 so that the spring holder 93 can move frontward and rearward in the axial direction while being restrained from rotating. A coil spring 97 is fitted on the small-diameter portion 12 in a position rearward of the spring holder 93. The coil spring 97 has an internal diameter larger than the diameter of the vibration switch cam 76. A front end of the coil spring 97 is held in the spring holder 93. A rear end of the coil spring 97 is in contact with a washer 98 provided at a front surface of the blocking portion 18. This washer 98 is disposed between the legs (inner and outer end portions 86, 87) of the coupling rods 85 and abuts on the front surface of the blocking portion 18 so that the washer 98 would not interfere with the coupling rods 85 moving according as the mode switch ring 79 rotates.

Six engageable pins 99 are pierced through the blocking portion 18 in positions arranged equidistantly in the circumferential direction in such a manner that the engageable pins 99 can move in the front-rear direction. Front ends of the engageable pins 99 are in contact with the washer 98. Rear ends of the engageable pins 99 are in contact with a front surface of the third-stage internal gear 23C. Trapezoidal cam projections 100 arranged equidistantly in the circumferential direction are disposed between the engageable pins 99 and brought into contact with the front surface of the internal gear 23C.

Accordingly, the engageable pins 99 receive the biasing force of the coil spring 97 transmitted through the washer 98 and is thereby pressed against the front surface of the internal gear 23C. As a result, the engageable pins 99 engage with the cam projections 100 in the circumferential direction so that the internal gear 23C is restrained from rotating. When the clutch ring 91 is operated to rotate, the spring holder 93 is screwed forward or backward in the axial direction to extend or contract the coil spring 97 in the axial direction so that an adjustment can be made to the pressing force. A click plate 102 is fixed to the small-diameter portion 12 by the stopper ring 101 in a position frontward of the clutch ring 91. The click plate 102 has a click pawl 103 configured to engage with and disengage from a plurality of detents 104 formed on a front surface of the clutch ring 91 so that a tactile click response is obtained during the operation of rotating the clutch ring 91.

Figure 4:
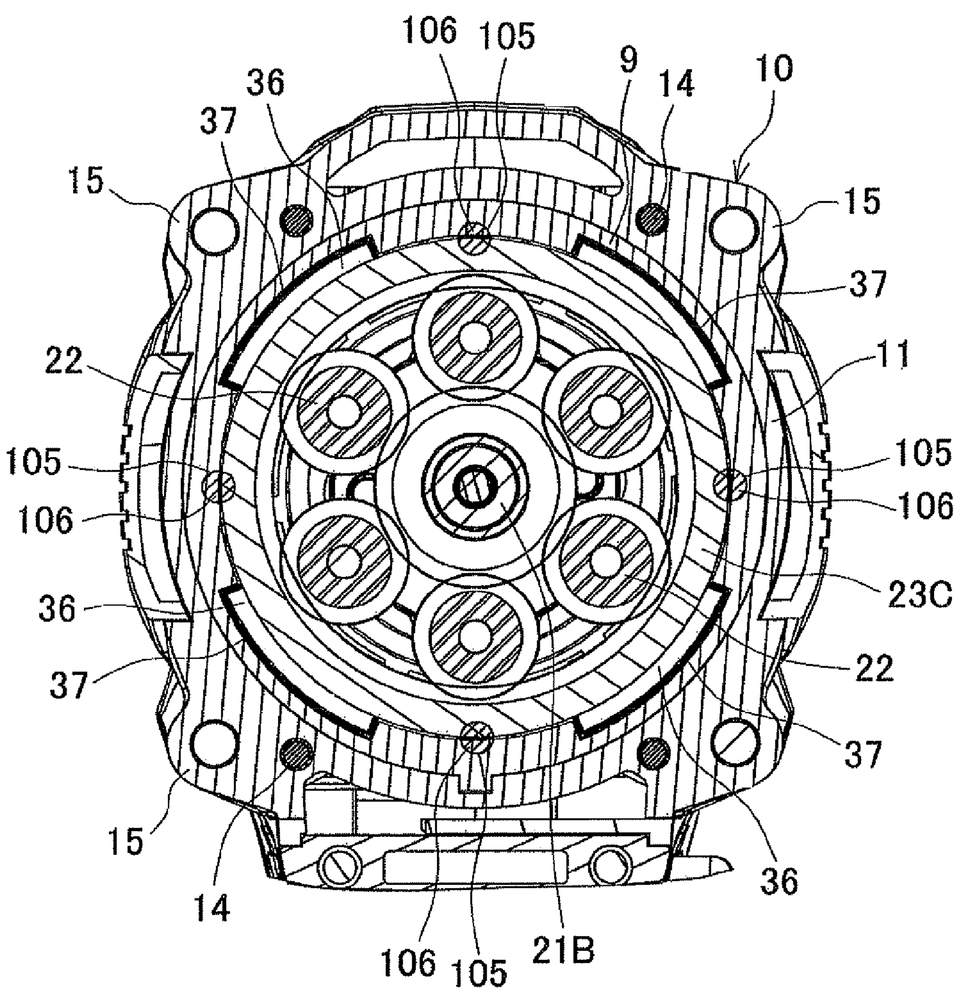
FIG. 4 is an enlarged section taken along line B-B of FIG. 1.

On the other hand, retaining grooves 105 are formed in an inner peripheral surface of a front portion of the first gear case 9. The retaining grooves 105 extending in the axial direction from the front end of the first gear case 9 are arranged at predetermined intervals in the circumferential direction in positions other than the positions in which the restriction grooves 37 are formed, as shown in FIG. 4. A rubber pin 106 is held in each retaining groove 105. The rubber pin 106 extends to contact with both of outer peripheral surfaces of the joint ring 34 and the internal gear 23C disposed inside the rubber pin 106, and compressed between the first gear case 9 and the internal gear 23C and between the joint ring 34 and the first gear case 9. The internal gear 23C is thus configured to always receive a resisting force counteracting its rotatory motion.

Figure 8:
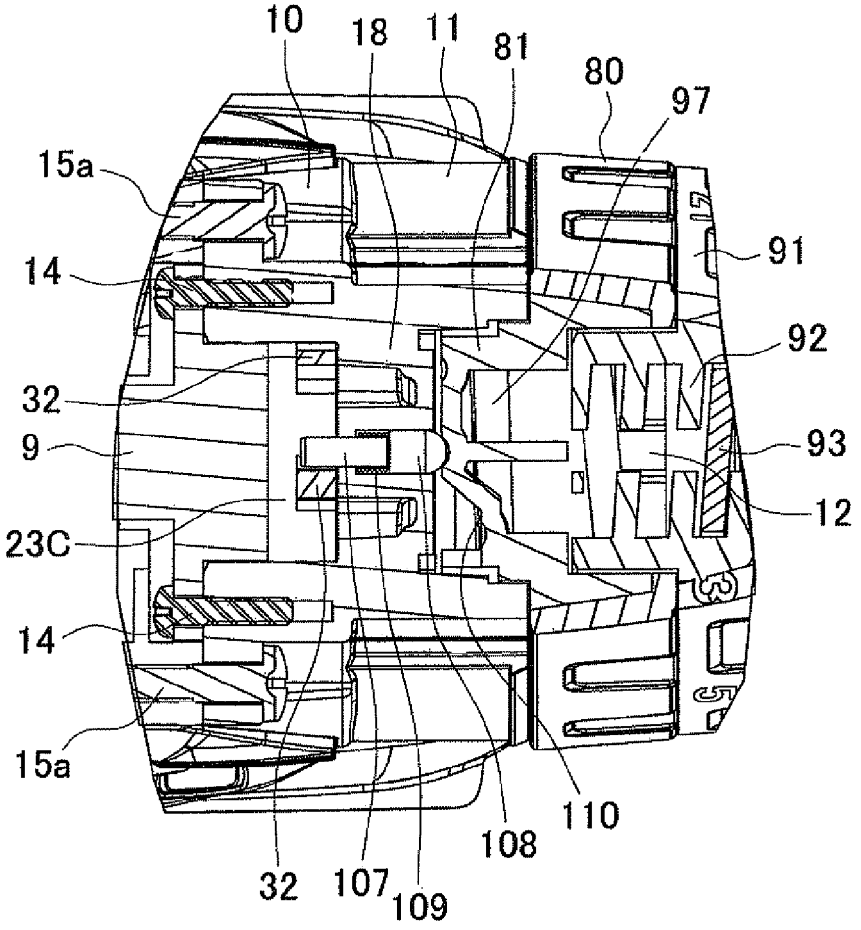
FIG. 8 is an enlarged section taken along line F-F of FIG. 1.

Moreover, restriction pins 107 are loosely fitted, from the front as shown in FIG. 8, in the blocking portion 18 in positions between the receptacle recessed portions 84. Each of the restriction pins 107 has a large-diameter head portion 108 formed at a front end portion thereof, and a rear end portion thereof is disposed to protrude rearwardly from the blocking portion 18. The thus-protruding rear end portion of each restriction pin 107 is engaged with external gear teeth 32 of the internal gear 23C. Each restriction pin 107 is pressed frontward by a coil spring 109 fitted on the restriction pin 107 between the blocking portion 18 and the head portion 108 of the restriction pin 107. In a position frontward of the restriction pins 107, the insert portion 81 of the mode change ring 79 is disposed so that the head portion 108 comes in contact with the insert portion 81. In a rear end of the insert portion 81, trapezoidal notches 110 are formed in positions that permit the notches 110 to be in phase with the restriction pins 107. To be more specific, when the mode change ring 79 is rotated to move the notches 110 to the positions phase-matched with restriction pins 107, the restriction pins 107 are advanced until the head portions 108 thereof are fitted in the notches 110, so that the restriction pins 107 are separated from the external gear teeth 32 of the internal gear 23C. On the other hand, when the mode change ring 79 is rotated to move the notches 110 out of the positions phase-matched with the restriction pins 107, the restriction pins 107 get out of the notches 110, running on the rear end portion of the insert portion 81, and move rearward so that the restriction pins 107 get engaged with the external gear teeth 32. With this engagement with the external gear teeth 32, the internal gear 23C is locked so as not to rotate.

In the percussion driver drill 1 configured as described above, three operation modes are selectable through the operation of rotating the mode change ring 79.

First, when the mode change ring 79 is in a first angular switch position (i.e., the position in which the coupling rods 85 are in positions (A) indicated by chain double-dashed lines in FIG. 5) where the notches 110 of the mode change ring 79 are in positions phase-matched with the restriction pins 107, the restriction pins 107 are advanced, thus releasing the internal gear 23C to make the internal gear 23C rotatable, as described above. In this operation, the mode change ring 79 causes the vibration switch cam 76 to be rotated by the coupling rods 85 into a second angular position in which the engageable recessed portions 78 are disengaged from the connecting pins 72. In this way, the second cam 58 comes in a freely rotatable state, while the internal gear 23C comes in a rotation-restrained state under the pressing force of the coil spring 97, so as to implement a clutch mode in which the pressing force applied to the engageable pins 99 (i. e., the maximum torque) can be changed through the operation of changing the clutch ring 91.

In this clutch mode, when the motor 3 is activated to cause the spindle 6 to spin, various operations, such as fastening, can be performed, for example, by turning and driving a screw with a driver bit installed on the drill chuck 7. In this operation mode, a resistance for retarding the rotation of the internal gear 23C is given by the rubber pins 106, and thus as long as the predetermined pressing force of the coil spring 97 is small enough, the internal gear 23C is prevented from running idle even if the startup torque of the motor 3 is added instantaneously thereto, so that premature disengagement of the clutch can be avoided.

When tightening of the screw proceeds and the load imposed on the spindle 6 exceeds the pressing force of the coil spring 97 which retains the internal gear 23C in position, the cam projections 100 of the internal gear 23C pushes the engageable pins 99 out frontward and causes the engageable pins 99 to run over the cam projections 100 relatively, to cause the internal gear 23C to run idle and the tightening of the screw is finished (i.e., the clutch is activated). In this occasion, the internal gear 23C runs idle even under the resisting action by the rubber pins 106. It is to be understood that even if the driver bit is pressed against the screw and causes the spindle 6 to be moved rearward until the first cam 57 is brought into contact with the second cam 58, the second cam 58 rotates together with the first cam 57 because the second cam 58 is in the freely rotatable state. Therefore, the spindle 6 would not make vibratory motion.

Second, when the mode change ring 79 is turned from the first angular switch position corresponding to the clutch mode to the left as viewed from the front into a second angular switch position (i.e., the position in which the coupling rods 85 are in positions (B) indicated by solid lines in FIG. 5), the notches 110 get out of the positions phase-matched with the restriction pins 107, as shown in FIG. 8. Therefore, the restriction pins 107 run on the rear end portion of the insert portion 81, and move rearward whereby the internal gear 23C is locked so as not to rotate. On the other hand, in this new mode, as well, the vibration switch cam 76 is in the second angular position in which the engageable recessed portions 78 are disengaged from the connecting pins 72, as shown in FIG. 9, thus, the second cam 58 is still in the freely rotatable state. Accordingly, a clutch mode is implemented in which the internal gear 23C is always locked so as not to rotate, irrespective of the magnitude of the pressing force of the coil spring 97.

In this drill mode, when the spindle 6 is caused to spin, the spindle 6 continues to rotate regardless of the magnitude of the load imposed on the spindle 6. It goes without saying that the spindle 6 would not make vibratory motion by any means.

Figure 10:
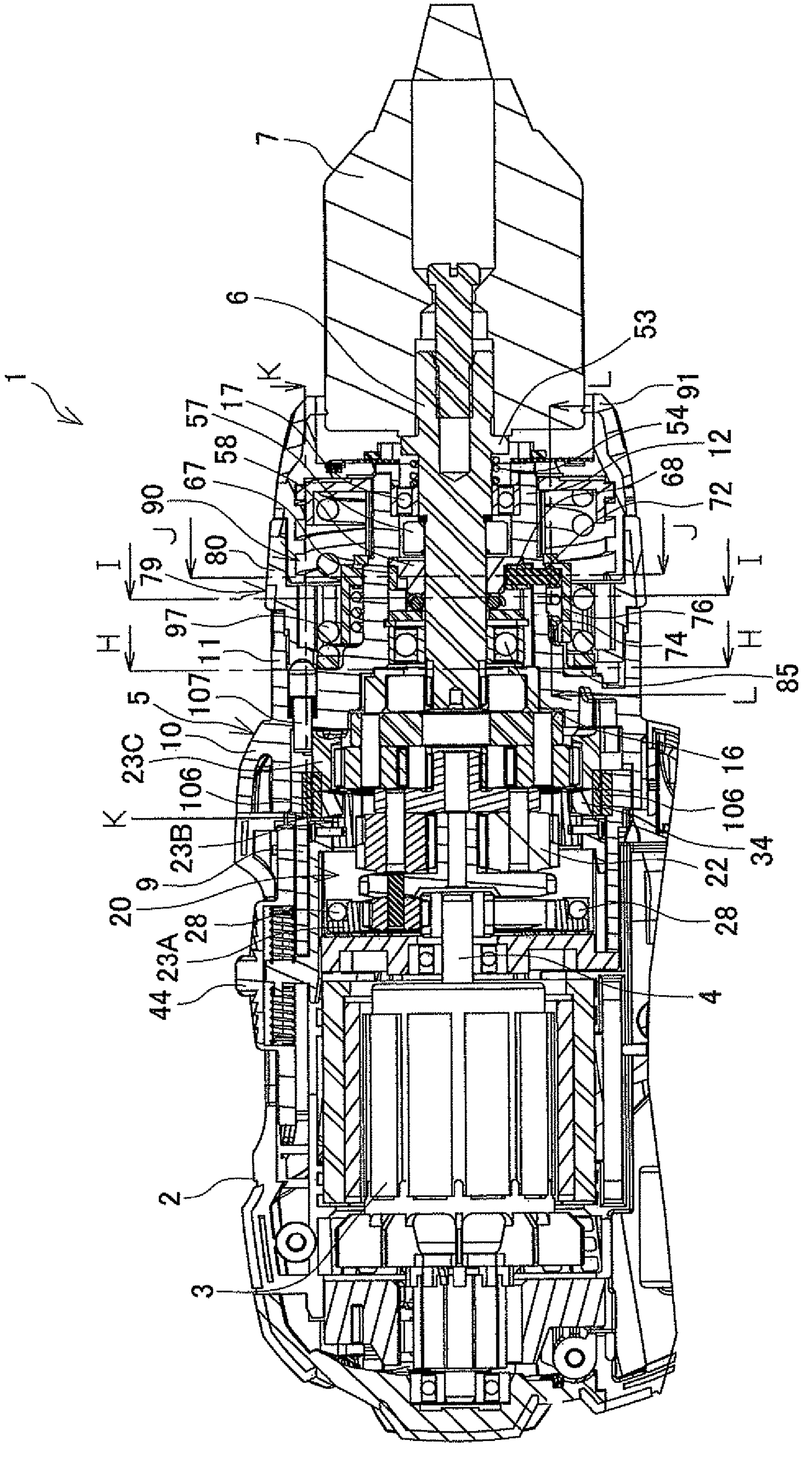
FIG. 10 is a longitudinal section of the percussion driver drill in a percussion drill mode.
Figure 11:
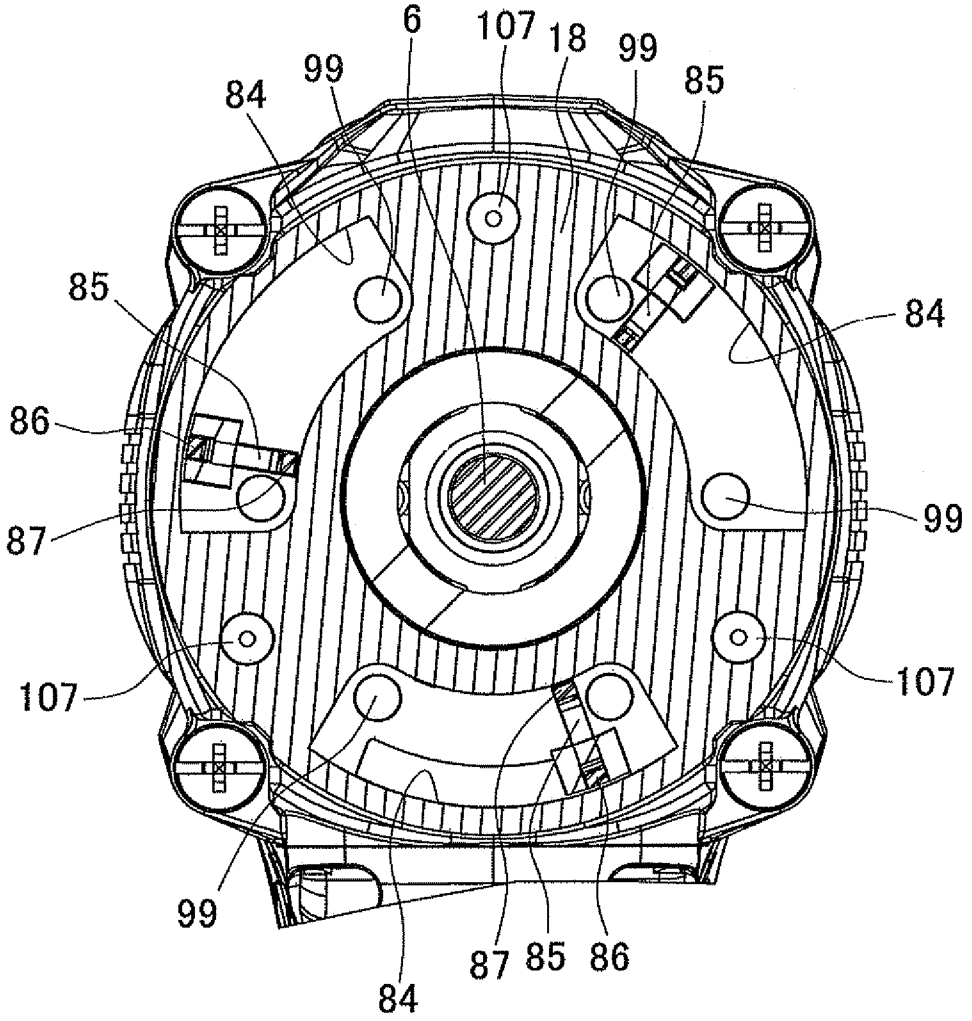
FIG. 11 is an enlarged section taken along line H-H of FIG. 10.
Figure 12:
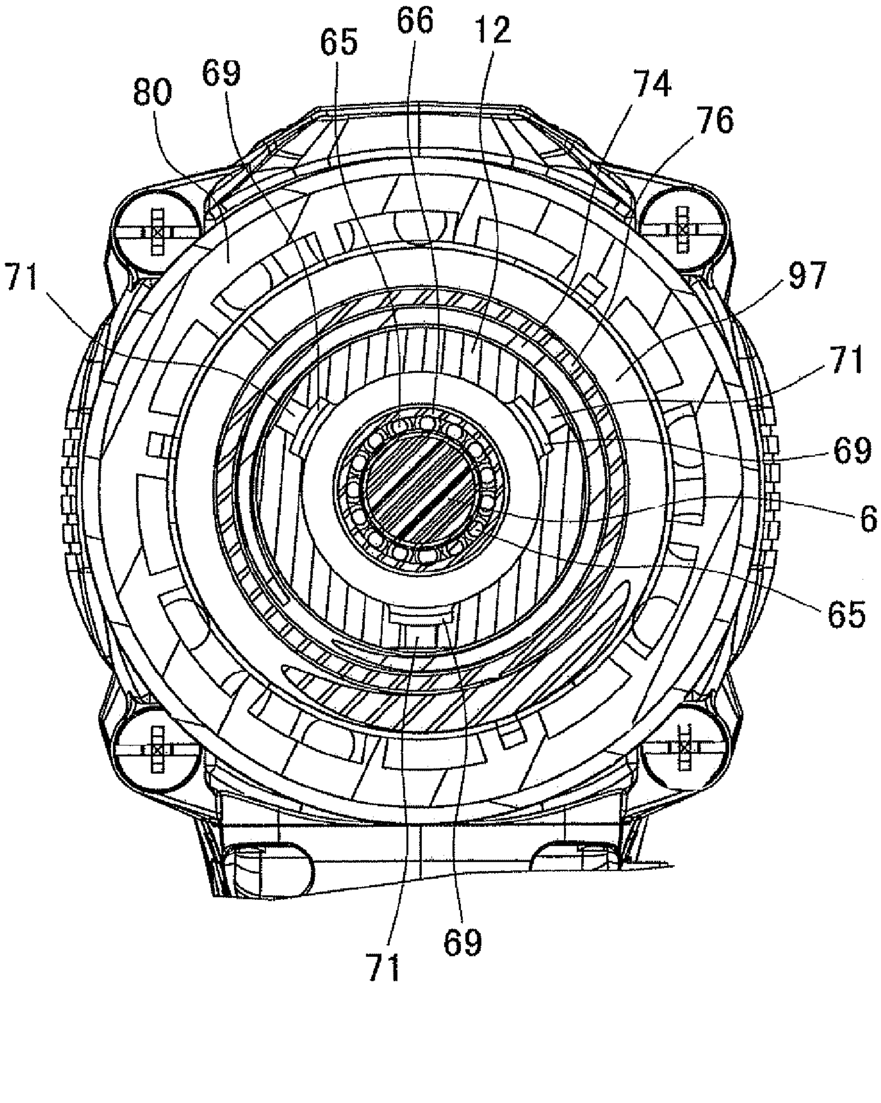
FIG. 12 is an enlarged section taken along line of FIG. 10.
Figure 13:
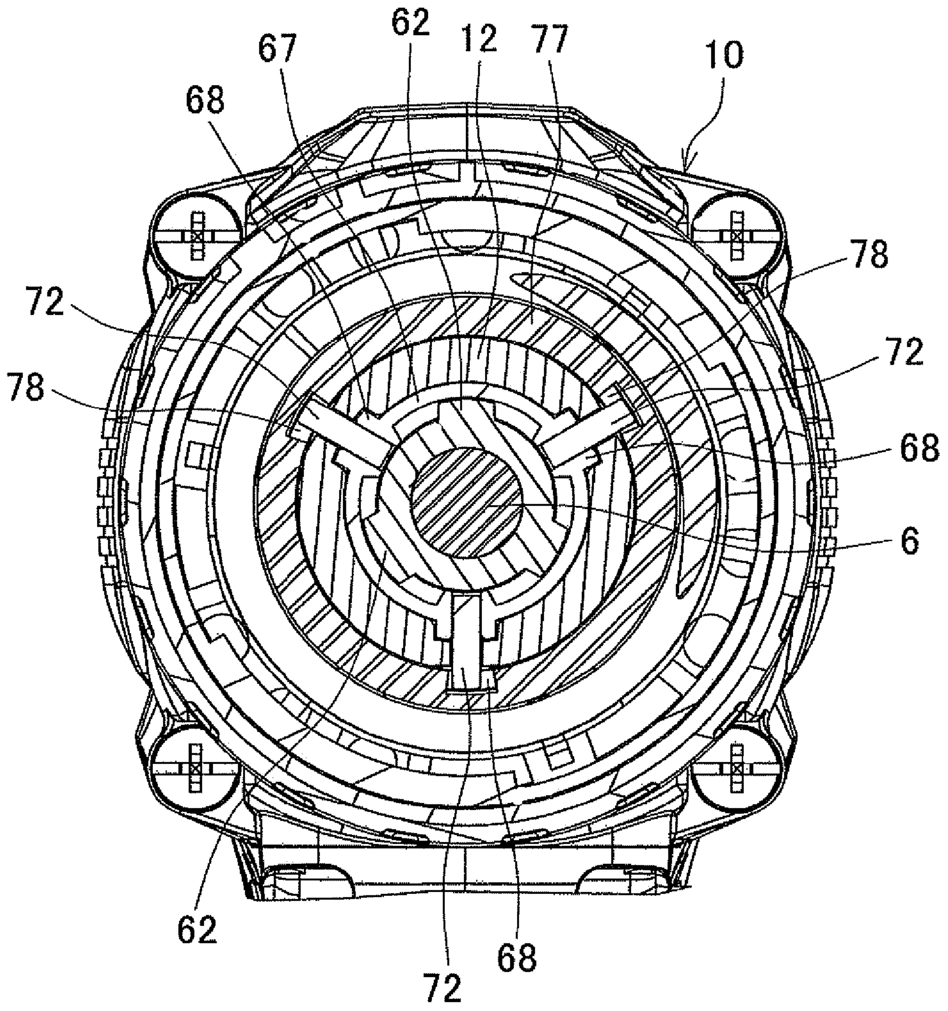
FIG. 13 is an enlarged section taken along line J-J of FIG. 10.
Figure 14:
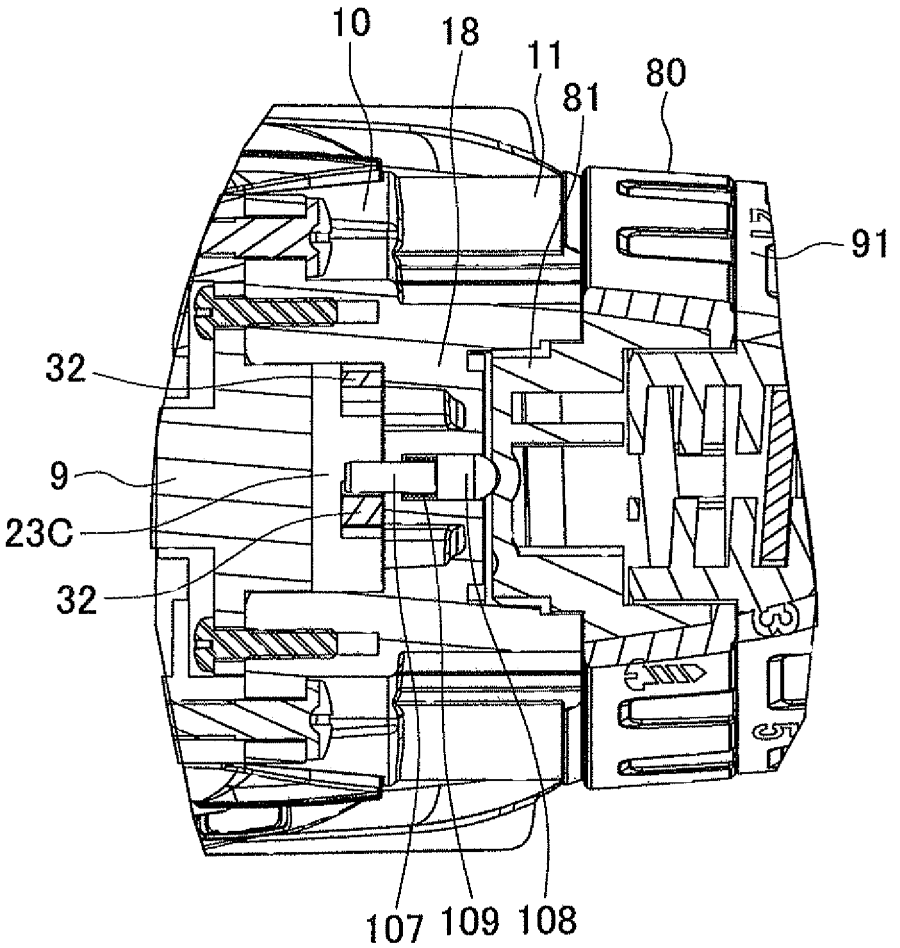
FIG. 14 is an enlarged section taken along line K-K of FIG. 10.
Figure 15:
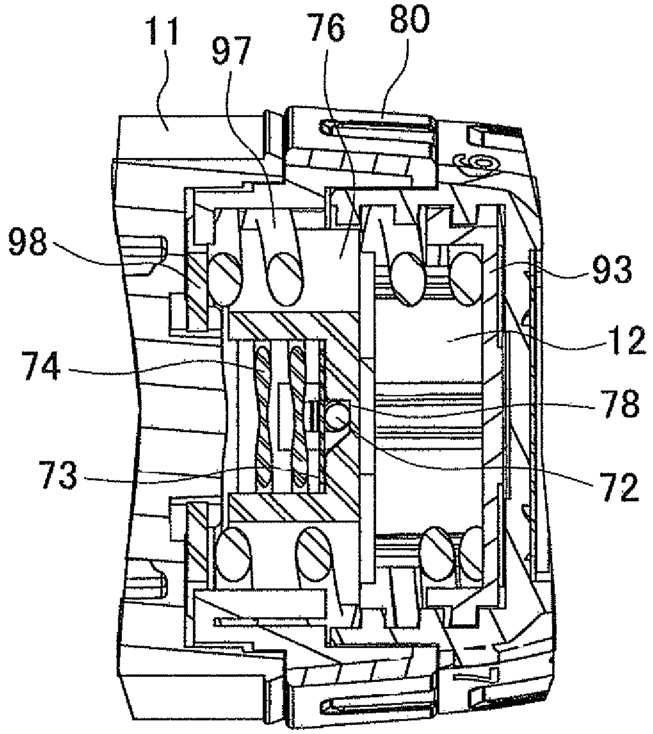
FIG. 15 is an enlarged section taken along line L-L of FIG. 10.

Third, when the mode change ring 79 is turned further from the second angular switch position corresponding to the drill mode to the left into a third angular switch position (i.e., the position in which the coupling rods 85 are in positions (C) indicated by chain double-dashed lines in FIG. 5 and the positions indicated by solid lines in FIG. 11), the notches 110 are separated farther from the restriction pins 107 while still being kept out of the phase-matched positions. Therefore, the internal gear 23C is locked so as not to rotate. On the other hand, the vibration switch cam 76 reaches the first angular position in which the engageable recessed portions 78 are in positions phase-matched with the connecting pins 72, thus, the connecting pins 72 are engaged with the engageable recessed portions 78 with the help of the pressing force of the coil spring 74 as shown in FIGS. 12 and 15, and the slide ring 67 is advanced as shown in FIGS. 10, 12 and 13 so that the second cam 58 is restrained from rotating. Accordingly, a percussion drill mode is implemented in which the first cam 57 and the second cam 58 are brought into contact with each other when the spindle 6 is in the retreated (rearward) position.

In this percussion drill mode, when the drill bit or other tool installed is caused to spin while being applied to and pressed against a workpiece thereby causing the spindle 6 to move to the rear, the first cam teeth 59 of the first cam 57 rotating together with the spindle 6 interferes with the second cam teeth 60 of the second cam 58 of which rotation is restricted. Thus, the spindle 6 is caused to make an axial vibratory motion. Since the internal gear 23C is locked so as not to rotate, the spindle 6 continues to rotate regardless of the magnitude of the load imposed on the spindle 6.

An indicator 111 for indicating a currently selected operation mode is placed on outer peripheral surface of the large-diameter portion 11 of the second gear case 10, as shown in FIG. 2. Three marks 112 for indicating three operation modes are placed on the mode change ring 79. Accordingly, a desired operation mode can be obtained by setting the indicator 111 to one of the marks 112.

With the percussion driver drill 1 configured in accordance with the present embodiment described above, the motor bracket 8 and the first gear case 9 are connected together by a pair of pins 28 pierced through the motor bracket 8 and the first gear case 9, and the pair of pins 28 are engaged with the first-stage internal gear 23A located at the first stage of the planetary gear speed reduction gear mechanism 20 whereby the first-stage internal gear 23A is restrained from rotating and located in position in the axial direction thereof. Therefore, the assembly of the motor bracket 8 and the first gear case 9 can be associated with the process of mounting the internal gears 23A. As a result, the shape of the first gear case 9 can be simplified and the rigidity thereof can be ensured.

In particular, in this embodiment, two pins 28 are disposed in positions axisymmetric with respect to the output shaft 4 of the motor 3, and thus the motor bracket 8 and the first gear case 9 can be combined together securely into one integral body.

Furthermore, in the present embodiment, the first-stage internal gear 23A includes partially trimmed portions at one side thereof, each of which is composed of an offset surface 29 and a flange portion 30, the offset surface 29 extending along the pin 28 pierced through the motor bracket 8 and the first gear case 9, the flange portion 30 protruding from a rear edge of the offset surface 29 in a direction perpendicular to the offset surface 29 and in a radial direction of the first-stage internal gear 23A, whereby the pin is in contact with the offset surface 29 to restrain the first-stage internal gear 23A from rotating and is in contact with the flange portion 30 to locate the first-stage internal gear 23A in position in the axial direction thereof. Therefore, a reasonable structure can be implemented in which a single pin 28 is used for two purposes of (a) restraining the internal gear 23A from rotating and (b) locating the internal gear 23A in position in the axial direction thereof.

Although the pin 28 is inserted from the right or from the left to thereby connect the motor bracket 8 and the first gear case 9 together in the present embodiment, the pin may be inserted from the top or from the bottom to connect the motor bracket 8 and the first gear case 9 together. Although the projections 26 of the first gear case 9 are fitted in the gap between the joint plates 24 formed in the motor bracket 8 and the pin 28 is pierced through them in the present embodiment, the projections and the joint plates may be provided in the motor bracket and in the gear case, respectively. It goes without saying that the joint plates and the projections may be shaped differently and the shapes thereof may be changed where appropriate. Moreover, the pin 28 is provided in pair in the present embodiment, but the number of the pins is not limited to this specific embodiment, only a single pin may suffice as long as the integrity of the combined members can be ensured.

Furthermore, the shapes of the motor bracket and the gear case may not be limited to the illustrated embodiment. For example, the gear case may not necessarily be of a two-part structure, but the both parts may be embodied in a single integrally formed body, instead.

On the other hand, the mode of engagement of the pin and the internal gear may not be limited to the specific configuration as described in the present embodiment and may be designed differently. For example, the partially trimmed portion may be in the form of a groove, the offset surface and the flange portion may be substituted with a through hole provided in the internal gear and extending in a tangential direction thereof. Namely, the pin may be engaged with the internal gear in any manner as long as the internal gear can be restrained from rotating and located in position in the axial direction thereof.

The power tool consistent with the present invention is not limited to the percussion driver drill as illustrated according to the present invention, but the present invention is applicable to any other type of power tool such as a power driver, a power drill or an impact driver as long as the tool comprises a motor and a gear case combined through a motor bracket.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

The invention claimed is:

1. A power tool comprising:
- a motor configured to generate rotation about an axis;
- a gear case disposed frontwardly of the motor and configured to accommodate a planetary gear speed reduction mechanism;
- a motor bracket attached to the motor and configured to connect the motor and the gear case together; and
- at least one pin pierced through the motor bracket and the gear case to connect the motor bracket and the gear case together,
- wherein the pin is engaged with a first-stage internal gear located at a first stage of the planetary gear speed reduction mechanism thereby configured to cause the first-stage internal gear to be restrained from rotating about the axis and configured to locate in a fixed position along the axis.

2. The power tool according to claim 1, wherein the pin comprises two pins disposed about an output shaft of the motor.

3. The power tool according to claim 1, wherein the first-stage internal gear includes a partially trimmed portion at a side thereof, which is composed of an offset surface and a flange portion, the offset surface extending along the pin pierced through the motor bracket and the gear case, the flange portion protruding from a rear edge of the offset surface in a direction perpendicular to the offset surface and in a radial direction of the first-stage internal gear, whereby the pin is configured to cooperate with the offset surface to restrain the first-stage internal gear from rotating about the axis and is configured to cooperate with the flange portion to locate the first-stage internal gear in a fixed position along the axis.

4. The power tool according to claim 3, wherein the pin comprises two pins, and the partially trimmed portion is provided for each of the two pins and located in positions according to a distance between the two pins.

5. The power tool according to claim 2, wherein the first-stage internal gear includes a partially trimmed portion at a side thereof, which is composed of an offset surface and a flange portion, whereby the pin is configured to cooperate with the offset surface to restrain the first-stage internal gear from rotating about the axis and is configured to cooperate with the flange portion to locate the first-stage internal gear in a fixed position along the axis.

6. The power tool according to claim 5, wherein the pin comprises two pins, and the partially trimmed portion is provided for each of the two pins and located in positions according to a distance between the two pins.

7. The power tool according to claim 1, wherein the motor bracket includes a pair of joint plates positioned around the axis and configured to protrude away from the motor with apertures formed therein, the gear case includes a projection protruding between the joint plates, the projection having a through hole extending between the apertures and configured to receive the pin inserted from either of the apertures of the joint plates and the through hole of the projection whereby cooperation between the motor bracket, the pin and the gear case fixedly connects them together.

8. The power tool according to claim 1, wherein the motor bracket is configured to support an output shaft of the motor.

9. The power tool according to claim 1, wherein a washer is interposed between the motor bracket and the first-stage internal gear.

10. A power tool comprising:

a motor configured to generate rotation about an axis;

a gear case disposed frontwardly of the motor and configured to accommodate a planetary gear speed reduction mechanism;

a motor bracket attached to the motor and configured to connect the motor and the gear case together; and at least one pin pierced through the motor bracket and the gear case to connect the motor bracket and the gear case together, wherein the pin is engaged with a first-stage internal gear located at a first stage of the planetary gear speed reduction mechanism thereby configured to prevent relative rotation between the gear case and the first-stage internal gear, and configured to prevent movement between the gear case and the first-stage internal gear along the axis.

11. A power tool comprising:

a motor configured to generate rotation about an axis;

a gear case disposed frontwardly of the motor and configured to accommodate a planetary gear speed reduction mechanism;

a motor bracket attached to the motor and configured to connect the motor and the gear case together; and at least one pin pierced through the motor bracket and the gear case to connect the motor bracket and the gear case together, wherein the pin is engaged with a first-stage internal gear located at a first stage of the planetary gear speed reduction mechanism thereby configured to prevent relative rotation between the gear case and the motor bracket, and to prevent movement between the gear case and the motor bracket along the axis.

12. A power tool comprising:

a motor configured to generate rotation about an axis;

a gear case disposed frontwardly of the motor and configured to accommodate a planetary gear speed reduction mechanism;

a motor bracket attached to the motor and configured to connect the motor and the gear case together; and at least one pin pierced through the motor bracket and the gear case to connect the motor bracket and the gear case together, wherein the pin is engaged with a first-stage internal gear located at a first stage of the planetary gear speed reduction mechanism thereby configured to prevent leakage of oil between the gear case and the motor bracket.

* * * * *